W. WINGATE.
BEARING FINDER.
APPLICATION FILED MAY 23, 1919.
1,336,010.
Patented Apr. 6, 1920.
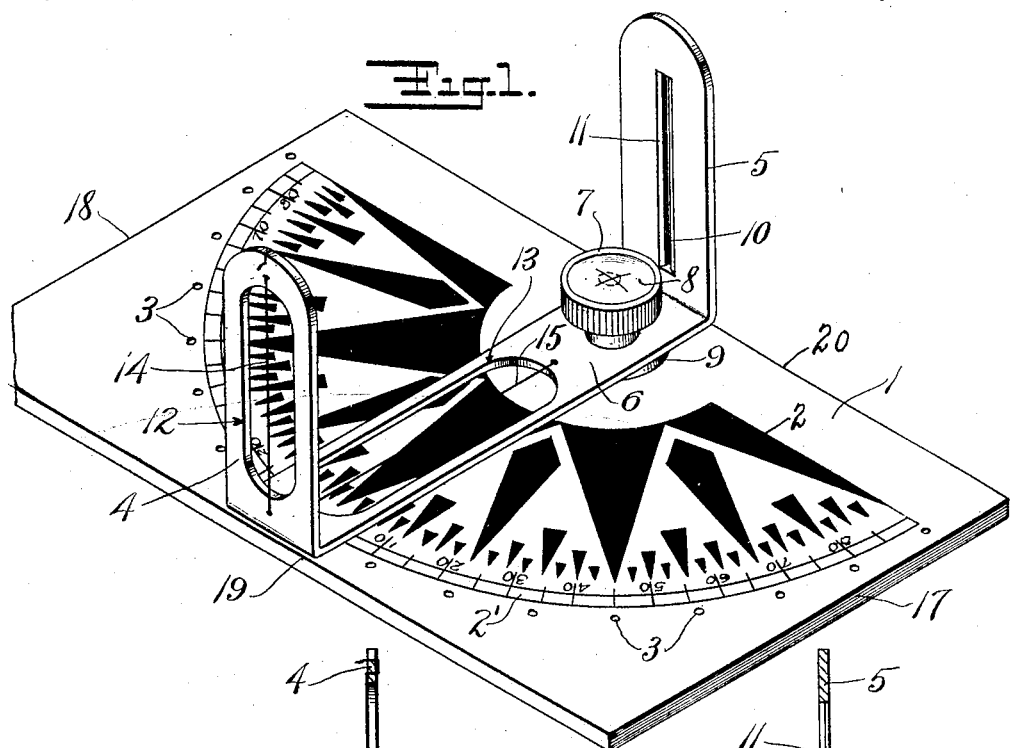
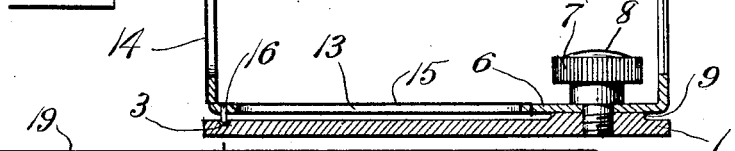
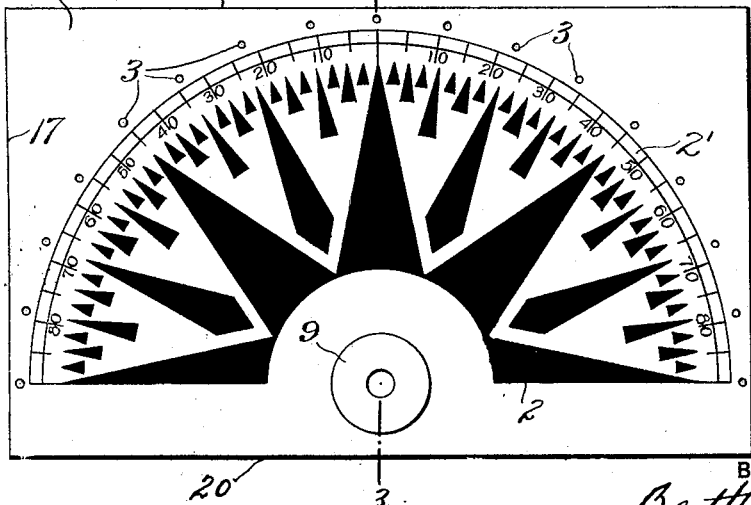
INVENTOR
W. Wingate
BY
Bartlett & Brownell
ATTORNEYS

UNITED STATES PATENT OFFICE.

WALTER WINGATE, OF VICTORIA, CANADA.

BEARING-FINDER.

1,336,010.  Specification of Letters Patent.  Patented Apr. 6, 1920.

Application filed May 23, 1919. Serial No. 299,140.

*To all whom it may concern:*

Be it known that I, WALTER WINGATE, a subject of the King of Great Britain, residing at Victoria, British Columbia, Canada, have invented a certain new and useful Improvement in Bearing-Finders, of which the following is a full, clear, and exact description.

My invention relates to a new and improved bearing finder and has for its object to produce a portable instrument which can be easily and correctly adjusted at many points on board a vessel, and is adapted for use in the dark as well as in the light.

One feature of my invention consists in the use, in conjunction with a sight, of a bearing plate having sides parallel to the zero line of the card thereon. Another feature consists in providing a level which is plainly visible to the eye when sighting through the sight. Another feature consists in mounting the sight with one vane adjacent to one edge of the plate. Another feature consists in providing the plate with a series of recesses placed opposite the even or the principal points of the card and providing the sight with a pin adapted to engage said recesses so that the instrument can be used in the dark. The instrument is essentially a nautical instrument and constitutes an inexpensive substitute for a pelorus, performing all its functions including its ability to obtain accurate bearings of the sun by means of the intersection of the shadows of the center wires on the dial surface. It is especially adapted for use on tow boats and coasting vessels where the only available compass is generally inclosed in the bridge house. One feature of the invention is that it is adapted to be used in connection with any true fore and aft surface or athwartship surface, it being the usual practice to have the principal surfaces of all the upper deck erections along one or the other of these lines.

The following is a description of an embodiment of my invention, reference being had to the accompanying drawings, in which, Figure 1 shows a perspective view of an instrument embodying my invention;

Fig. 2 is a plan view of the plate carrying the dial;

Fig. 3 is a vertical section of the instrument on the line 3 of Fig. 2.

Referring more particularly to the drawings, 1 is a plate made of celluloid, vulcanite or other non-magnetic material having engraved or stamped thereon, so as to be readily distinguishable in the dark, a half dial 2 showing points similar to half of a compass card and a graduated semi-circle 2'. This plate constitutes a bearing plate and is also provided with slight depressions 3 opposite the points of the dial for the purpose hereinafter stated, the principal points beginning at zero and spaced every eleven and a quarter (11¼) degrees, while what are known as the even points are at the zero, forty-five (45) and ninety (90) degree marks. The angles used in laying off a course to be followed usually coincide with the principal points of the dial. The plate 1 is preferably about eight and a quarter (8¼) inches by four and three-quarter (4¾) inches in dimensions. Pivotally mounted upon the plate is a sight having sight vanes 4 and 5 connected by a horizontal member 6, the pivot being formed by a clamping screw 7 having a milled head and threaded shank making screw engagement with the plate 1. The head of the screw 7 is recessed and within the recess is a circular bubble level 8. A boss 9 raises the member 6 from the plate 1. The sight vane 5 is provided with a vertical slot 10 whose inside edges are beveled as shown at 11. The width of the slot is about .05 of an inch. The vane 4 and the horizontal portion 6 are provided with wide openings 12 and 13 across which are tightly stretched the portions 14 and 15 of a continuous wire, both lying in a vertical plane passing through the axis of the clamping screw 7 and the slot 10. Near the extreme end of the member 6 is a downwardly projecting pin 16 in line with the wire 15 and adapted to be received by any one of the recesses 3.

As above stated, two sides 17 and 18 of the plate are parallel to the zero line of the dial. The other two sides 19 and 20 of the plate are preferably at 90° thereto. The pivot formed by the set screw 7 and the vane 5 are located near one edge of the bearing plate so that the eye of the observer when sighting through the slot 10 does not have to be moved any considerable distance when the vane 4 is being swung from one position to another.

In using this instrument one of the sides 17—18 is placed against any convenient fore and aft surface of the vessel or the side 19 may be placed against athwartship or beam surface. The instrument is then brought to a level position, this being determined by the indication of the circular level 8 set in the head of the set screw 7, which is visible to the observer when looking through the slot 10. The vane 4 is then moved until the object to be sighted is visible through it and in line with the slot 10 and wire 14, whereupon the reading is made upon the dial so that the bearing of the vessel with reference to the object is determined. The plate is held against any suitable fore and aft or athwart surface with one hand while the sight is adjusted to the bearing by the other hand. The pin 16 on the sight in conjunction with the depressions 3 on the dial plate allows of an automatic adjustment to bearings on any even or any principal point, so that at night, particularly in stormy weather when no light is available, a reliable bearing can be obtained by these means.

The use of the circular bubble level on the set screw in conjunction with the form of sight is a great advantage, since it allows the bubble to be in full view with the observer's eye in transit.

One great advantage of this instrument is its handiness in observing the relative bearing of approaching vessels and its aid in avoiding collision.

In determining the position of the sun, the sight is moved until the shadows of the wires 14 and 15 upon the plate coincide.

Another advantage of this instrument lies in the convenience with which bearings can be laid directly on the chart without the necessity of any corrections due to deviation or variation of the compass. The course line being laid off on the chart as is the usual practice, the bearing is taken and the instrument placed on the chart the sight vane in alinement with the course line where one edge cuts the object observed, a line produced along that edge will cut the course line at the position of the ship. To perform this function it is not necessary that the plate be made of clear celluloid but with a clear celluloid plate several bearings may be laid off simultaneously in a similar manner.

As will be evident to those skilled in the art, my instrument permits of various uses other than those particularly described and my invention permits of various modifications without departing from the spirit thereof or the scope of the appended claims.

What I claim is:

1. In a nautical instrument, the combination of a bearing plate having parallel straight edges and a semi-circular scale thereon, said scale having a zero line at right angles to the diameter thereof and parallel to said straight edges, a sight having two sight vanes, a set screw pivotally securing the sight to said plate, and a circular level in the line of vision between said sight vanes.

2. In a nautical instrument, the combination of a bearing plate having parallel straight edges and a semi-circular scale thereon, said scale having a zero line at right angles to the diameter thereof and parallel to said straight edges, the center of the scale being adjacent to the periphery of the plate, a sight having two sight vanes, a set screw adjacent to one end of said sight pivotally securing the same to said plate, and a circular level in the line of vision between said sight vanes.

3. In a nautical instrument, the combination of a bearing plate having parallel straight edges and a semi-circular scale thereon, said scale having a zero line at right angles to the diameter thereof and parallel to said straight edges, the center of the scale being adjacent to the periphery of the plate, a sight having two sight vanes, a set screw adjacent to one end of said sight pivotally securing the same to said plate, and a circular level in the line of vision between said sight vanes, the end of said plate remote from said pivot being at right angles to the line passing through the zero mark.

4. In a nautical instrument, the combination of a bearing plate having parallel straight edges and a semi-circular scale thereon, said scale having a zero line at right angles to the diameter thereof and parallel to said straight edges, a sight having two sight vanes, a set screw adjacent to one end of said sight pivotally securing the same to said plate, and a circular level in the line of vision between said sight vanes, said plate being provided with recesses opposite the even points of said scale and said sight being provided with a pin adapted to engage said recesses.

5. In a nautical instrument, a rectangular plate having a semi-circular scale thereon, said scale having a zero line at right angles to the diameter thereof and parallel to opposite sides of said plate, a sight comprising two sight vanes, a securing screw pivotally securing one end of said sight at the center of said scale and adjacent one of the sides of said plate, and a circular level mounted in the head of said securing screw.

6. In a nautical instrument, a rectangular plate having a semi-circular scale thereon, said scale having a zero line at right angles to the diameter thereof and parallel to opposite sides of said plate, a sight comprising two sight vanes, a securing screw pivotally securing one end of said sight at the center of said scale and adjacent one of the sides of said plate, the end of the plate remote from said pivot being at right angles to the radius passing through the zero point of said scale, and a circular level in the line of vision between said sight vanes.

WALTER WINGATE.